United States Patent [19]

Cooper

[11] 4,009,572

[45] Mar. 1, 1977

[54] HYDROSTAT SYSTEMS CONTAINING COAXIAL MULTIDIRECTIONAL FLOW CONTROL VALVES

[75] Inventor: Roydon B. Cooper, Locust Valley, N.Y.

[73] Assignee: Pall Corporation, Glen Cove, N.Y.

[22] Filed: Oct. 31, 1974

[21] Appl. No.: 519,726

Related U.S. Application Data

[62] Division of Ser. No. 356,231, May 1, 1973, Pat. No. 3,908,693.

[52] U.S. Cl. .............................. 60/454; 137/493; 210/13
[51] Int. Cl.[2] ................... F15B 15/18; F16K 17/26
[58] Field of Search ................. 210/130, 136, 134; 137/493; 60/336, 454

[56] References Cited

UNITED STATES PATENTS 3,229,816   1/1966   Rosean ............................. 210/130

FOREIGN PATENTS OR APPLICATIONS 1,299,861   12/1972   United Kingdom ............... 137/493

Primary Examiner—Martin P. Schwadron

[57] ABSTRACT

Hydrostat systems are provided containing a coaxial multidirectional flow control valve interposed between a pump and a hydraulic motor, to direct flow in one direction through one path and to direct flow in the opposite direction through another path, to provide a bypass function, such as to bypass a filter. The valves are space-saving, can be kept closed under low biasing forces, and can be made light in weight, affording a low-mass valve that can be moved in milliseconds from a closed to an open position. The valves can control not only different forward and reverse flow paths, but also a path for a bypass function such as relief flow through one of the forward and reverse flow paths. When two valves are used, unidirectional flow through can be achieved regardless of direction of flow in the fluid line.

29 Claims, 11 Drawing Figures

HYDROSTAT SYSTEMS CONTAINING COAXIAL MULTIDIRECTIONAL FLOW CONTROL VALVES

This application is a division of Ser. No. 356,231, filed May 1, 1973, now U.S. Pat. No. 3,908,693 issued Sept. 30, 1975, but including additional disclosure.

Hydrostat systems are composed of a hydraulic pump and a hydraulic motor coupled together in a closed-fluid-flow loop or circuit to provide a fluid drive for vehicles and to operate light and heavy-duty machinery, such as tractors and earth-moving equipment and paper mill machinery. The pump operates the motor by pumping the fluid to the motor which returns the fluid to the pump, and the motor in turn rotates an axle or other rotating member to drive the vehicle or machinery. Operation in either direction can be obtained in the same system by control of the direction of flow of fluid through the system, and the side of the motor to which the fluid is pumped. Fluid entering the motor from a first direction drives the motor in one direction, while fluid entering the motor from a second direction drives the motor in the opposite direction. The motor thus can drive the vehicle or machinery in either direction, according to the direction of flow of the fluid from the pump to the motor. The fluid flow between the pump and the motor is normally in a closed circuit through either of two fluid paths, one path being followed for clockwise operation and the other path being followed for counterclockwise operation, and the fluid paths enter opposite sides of the motor so as to drive it clockwise or counterclockwise, for operation in one direction or the other, which may be forward or in reverse. The fluid paths are in a closed flow loop or circuit of the type shown in FIG. 1, and each path carries forward or reverse flow, according to the direction of flow through the required system for the desired operation.

The terms "clockwise" and "counterclockwise" are applied herein to the direction of operation of the fluid drive; clockwise or righthand flow operates the drive in one direction, and counterclockwise or lefthand flow operates the drive in the opposite direction.

The terms "forward" and "reverse" are herein applied to the direction of flow of fluid through a given fluid path of the system between the pump and the motor. Forward flow is from the pump to the motor, and reverse flow is from the motor to the pump, in the same fluid path. Flow through a filter in the filtering direction is also referred to as forward flow; flow bypassing the filter is referred to as reverse flow.

It is thus seen that "forward" as applied to the direction of flow in the fluid path coincides with and refers to the flow direction required for either clockwise or counterclockwise operation.

Because the system operates the drive by fluid flow, and because the wear of the moving parts tends to introduce foreign particles, bits of metal and other debris into the hydraulic fluid circulating through the system, it is customary to provide a filter in each fluid path, to filter the fluid, and thus clean the fluid from any particles which might damage the moving parts of the motor and pump. The filter is usually interposed to clean the fluid during forward flow from the pump to the motor. The filter can also be interposed to filter the fluid during flow from the motor to the pump. Introduction of the filter to filter flow in either flow direction in the system ensures that only clean fluid is supplied to the motor and the pump.

As the filter removes suspended material from the fluid, the filter tends to become clogged, and the flow through the filter diminishes, while the differential fluid pressure across the filter increases. Unless the filter element is changed before it becomes fully clogged, the motor may be starved, and operation may become erratic or slow. Hydrostat systems normally operate under quite high internal fluid pressures, of the order of 5500 psi and higher. At such high pressures, if clogging is substantial and the differential fluid pressure across the filter element increases and approaches system pressure, the filter may rupture, dumping its load of contaminants upon the motor and the pump.

It is accordingly desirable, should it be impossible to change the filter element for some reason, to provide for a relief path for forward flow bypassing the filter element. Such a relief path ensures that the contaminant load on the filter will not be dumped on the motor and pump suddenly, due to rupture of the filter under a higher than normal differential pressure across the filter.

A hydrostat system provided with a filter requires some means for controlling reverse flow so that it does not pass through the filter. If reverse flow were to pass through the filter, it would unload the contaminants separated out by the filter, and carry them back to the pump and motor, with resultant destructive action on their moving parts. Consequently, it is customary to provide a bidirectional valve in the system which under forward flow directs fluid through one path, by way of the filter, and under reverse flow directs fluid through another path, bypassing the filter.

The design of a bidirectional valve that will meet the pressure and rapid flow reversal requirements of modern hydrostat systems has posed numerous problems, and the bidirectional valves heretofore available have not been fully satisfactory in meeting the requirements. Many such systems require a high speed of reversal of the drive, within from 40 to 50 milliseconds. The bidirectional valves that have been used are not capable of responding so quickly, and consequently there is a time lag in the reversing, which is undesirable.

British Pat. No. 1,299,861 to Fairey Aviation Ltd. describes a closed circuit hydrostat system including bidirectional valves which are typical of those that have been used. The valves are complex in construction, expensive to make, position-sensitive, and give a slow response to change in the direction of operation from forward to reverse and from reverse to forward. The bidirectional valves do not provide a flow path which bypasses a clogged filter. A separate relief valve on the filter is required for this purpose, further increasing the complexity and cost of the system.

Another difficulty posed by hydrostat systems, which must be met by bidirectional valves, is the necessity of passing full flow in either direction immediately, to avoid starvation of the motor and/or the pump. This poses a design problem in any valve which is responsive to a differential fluid pressure across the valve. The usual design of valve, such as the ball-and-poppet and the Belleville washer, is responsive to the fluid pressure differential across the valve to provide a large valve opening at a high differential pressure, and a lesser valve opening at a lower differential pressure. Once the valve has opened a little, the pressure differential across the valve decreases, with the result that it becomes impossible to open the valve any further. The larger the flow required, the larger the valve element that is needed to expose a large opening, and this increases the differential pressure required to open the valve. Moreover, the larger the valve, the larger the mass of the material which has to be put in motion to open the valve. For these reasons, the design of a bidirectional valve that is capable of operating in a confined space, has a low mass and opens quickly to provide for full flow immediately upon change of flow direction, has proved to be a complex and perplexing problem, which has not been resolved up until now.

In accordance with the invention, a hydrostat system is provided having in the flow circuit a coaxial multidirectional flow control and, optionally, relief, valve responsive by way of pressure actuating surfaces to a predetermined fluid pressure differential thereacross arising from flow to open or to close. The valve can be arrange to direct forward fluid flow through one path, and reverse fluid flow through another path. Thus, for example, when used in combination with a filter element, it can be bidirectional, arranged to direct forward flow through the filter element and reverse flow bypassing the filter element. In a preferred embodiment, the valve can also be tridirectional, and provided with pressure actuating surfaces arranged under a predetermined fluid pressure differential arising from flow to open a path during forward flow bypassing the filter element, so that the valve controls flow through two different fluid paths when the flow is in the forward direction, and flow through one fluid path (which can be the same as one of the two forward fluid paths) when flow is in the reverse direction.

The valve is in coaxial tubular form, with first and second tubular valve elements reciprocating between open and closed positions along a longitudinal axis. The valve can thus be inserted in-line, or within the fluid line, utilizing a portion of its open central flow space to accept the reciprocating movement of the valve elements. The valve can also be inserted in the open space provided by the core of a tubular filter element.

The two reciprocating valve elements are each provided with pressure actuating surfaces but on opposite sides, so as to move one of the valve elements or the other between open and closed positions in response to fluid pressure differentials thereacross arising from flow of fluid in either direction through the fluid line. During forward flow, the first reciprocating valve element under a force applied to its forward pressure actuating surface above a predetermined first minimum moves into a first position in which it directs forward flow through one path, such as through a filter. Upon reversal of flow, a pressure actuating surface responsive to reverse flow on the second reciprocating valve element receives reverse fluid pressure in a manner to move the second valve element into an open position, to direct flow through another path bypassing the filter element. The preferred embodiment has a first reciprocating valve element which has a second position into which it moves under a fluid pressure applied to the forward pressure actuating surface above a higher second predetermined minimum, such as when the filter element is clogged, to open a fluid path for relief flow bypassing the filter element. This fluid path optionally utilizes the same bypass line opened by the valve element but now for relief flow in the opposite direction.

The hydrostat system provided in accordance with the invention comprises a pump; a fluid line operatively connecting the pump with the motor, and arranged to carry fluid flow therebetween in either direction; a unidirectional function which can accept flow in only one direction, such as a filter, interposed in the fluid line between the pump and the motor, for acceptance of fluid flow either in forward flow from the pump to the motor or in reverse flow from the motor to the pump; and a coaxial multidirectional flow control valve in fluid flow connection with the fluid line and with the function and interconnected by at least one fluid line in series flow connection with the function, and at least one fluid line in parallel bypass flow connection with the function, and controlling flow through the series and the parallel lines, the valve directing fluid flow in one direction through the function via the line in series with the function, and fluid flow in the opposite direction bypassing the function via the line in parallel with the function, sensing and responding to a fluid pressure differential thereacross arising from the direction of fluid flow that is higher on the upstream than on the downstream side, to direct flow in one direction through the function, and close the line bypassing the function, and to direct reverse flow in the opposite direction bypassing the function and close the line leading to the function.

In a further preferred embodiment of hydrostat system in accordance with the invention, two coaxial bidirectional flow control valves are used in tandem, to provide for flow in the same direction through the filter from either direction of flow through the fluid line. One coaxial bidirectional flow control valve directs flow through the filter in one direction from one direction of flow through the fluid line, and the other coaxial bidirectional flow control valve directs flow in the same direction through the filter from the other direction of flow.

The coaxial multidirectional flow control valve used in the hydrostat systems in accordance with the invention comprises, in combination, a tubular valve housing, first and second valve seats in the housing; first and second valve elements separately reciprocable within the valve housing towards and away from the first and second valve seats, respectively, between closed and open positions; bias means urging the valve elements in one direction; and a fluid pressure receiving surface operatively connected to each valve element, urging the first valve element in one direction towards or away from its valve seat, and urging the second valve element in the other direction, towards or away from its valve seat; the biasing force of the bias means being adjusted to resist movement of each valve element in said direction towards or away from its valve seat under differential fluid pressure arising from flow and applied to the fluid pressure receiving surface up to a predetermined minimum, and the valve element moving in said direction towards or away from its valve seat and opening at differential fluid pressures arising from flow applied to the fluid pressure receiving surface above said minimum, one of the valve elements being responsive to differential fluid pressure arising from flow from one side of the valve, and the other valve element being responsive to differential fluid pressure arising from flow from the other side of the valve, so that the valve is arranged to open or close in response to differential fluid pressure arising from either direction of flow.

The coaxial multidirectional flow control valve of the invention can also be arranged to provide normal and bypass flow in one direction through different paths, in addition to return bypass flow in the other direction through the bypass path. In this event, one of the valve elements is provided with a fluid pressure receiving surface receiving differential pressure from either side of the valve, and the biasing force of the bias means is adjusted to resist movement of the valve element towards or away from its valve seat under differential fluid pressure applied to the fluid pressure receiving surface from either side of the valve up to a predetermined minimum, which on the side of the valve to which the first valve element is responsive is higher than the predetermined minimum at which the first valve opens. There is accordingly a range of lower differential pressures over which the first valve element is open, but not the second, up to the predetermined minimum at which the second valve element opens, and a second range of higher differential pressures at which both the first and the second valve elements are open. If the first element controls flow through a passage for flow through the function, and the second valve element controls flow through a bypass passage bypassing the function, normal and relief flow are provided for in one direction. Flow in the other direction through the bypass passage is controlled by the second valve element.

This kind of valve is particularly useful in series flow and parallel flow with respect to a filter element in a hydrostat system. The first valve element can control normal series flow through the filter element, and the second valve element can control flow in the same direction but bypassing the filter element at differential fluid pressures above a predetermined minimum reached when filter element blockage seriously reduces flow. The second valve element also provides parallel flow in the opposite direction bypassing the filter element, to avoid unloading the filter element during such flow.

To provide for flow in the same or normal direction through a filter element from either direction of flow through a fluid line in the hydrostat system of the invention, two valves are used. One valve element of each valve is arranged to open upon flow from one of the two directions through the line, and the other valve element is arranged to open upon flow from the other direction through the line. The former valve element controls flow to the filter, and the other valve element receives flow from the filter. This arrangement ensures that all flow through the fluid line is filtered and helps to prevent damage to other parts of the system upon failure of one part contributing debris to the fluid flow.

In a preferred embodiment of the invention, the valve elements are tubular, and provide for normal fluid flow through the open center of the first tubular valve element. Reciprocation of the second valve element opens or closes a flow passage extending laterally of the valve element, through or at one end of the tubular valve housing, bypassing the fluid-flow passage through the valve element. The first valve element can be arranged to move reciprocably within the second valve element between positions opening and closing the passage for fluid flow through the first valve element, and the first valve element is responsive to differential fluid pressure arising from flow in one direction, and the second valve element is responsive to differential fluid pressure arising from fluid flow in the other direction, and, if desired, in the same direction as well.

By utilizing the open tubular passage of the valve elements for fluid flow, the valves of the hydrostat systems of the invention are capable of passing a larger fluid flow at a lower pressure drop than other designs of valve.

An advantage of the tubular construction is that the valve elements can be light in weight, and reciprocate very quickly between open and closed positions in several milliseconds.

Sealing means can be provided between the valve elements and the valve housing to prevent fluid leakage therebetween through the valve. The sealing element is not essential, and a fluid-tight fit between the valve elements and the tubular valve housing can also be employed, and is preferred, especially at high fluid pressures, such as may be encountered in hydrostat systems.

Since the valve elements are normally closed when there is no fluid flow, the valve also serves as an anti-drain-back valve. If the valve is in series with a filter element when a filter element is being changed, the valve prevents loss of fluid from the line leading to the motor, and since the pump is in effect a closed valve, there is no loss of fluid from the line leading to the pump. Consequently, the only fluid lost during a filter change is the fluid in the filter bowl.

Preferred embodiments of the coaxial valve and hydrostat systems of the invention are shown in the drawings, in which:

FIG. 1 is a flow diagram showing a hydrostat system having a pump and a motor connected by two fluid lines, each with a filter assembly and a coaxial valve of the invention in each line;

FIG. 2 is a detailed view in longitudinal section through a filter assembly of FIG. 1, including a filter bowl, a tubular filter element within the bowl, and a coaxial valve in accordance with the invention disposed within the filter element, in which the reciprocable valve elements control flow through or bypassing the filter element under predetermined conditions of differential fluid pressure arising from fluid flow in either direction through the filter assembly, and showing both valve elements in closed positions;

Figure 9:
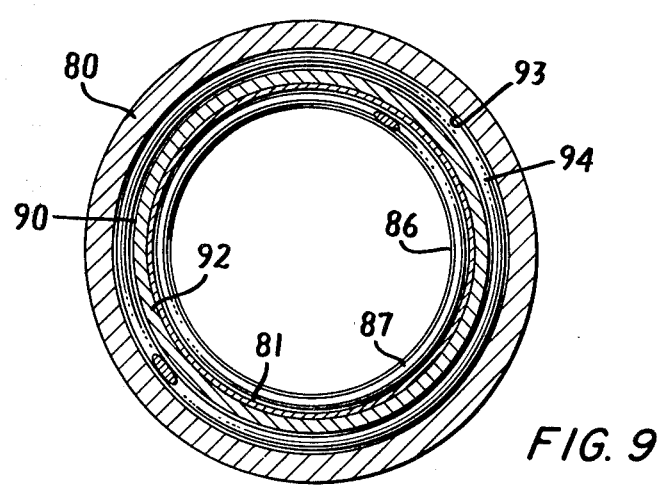
FIG. 9 is a cross-section through the valve element of FIGS. 7 and 8, taken along the line 9—9 and looking in the direction of the arrows.
Figure 8:
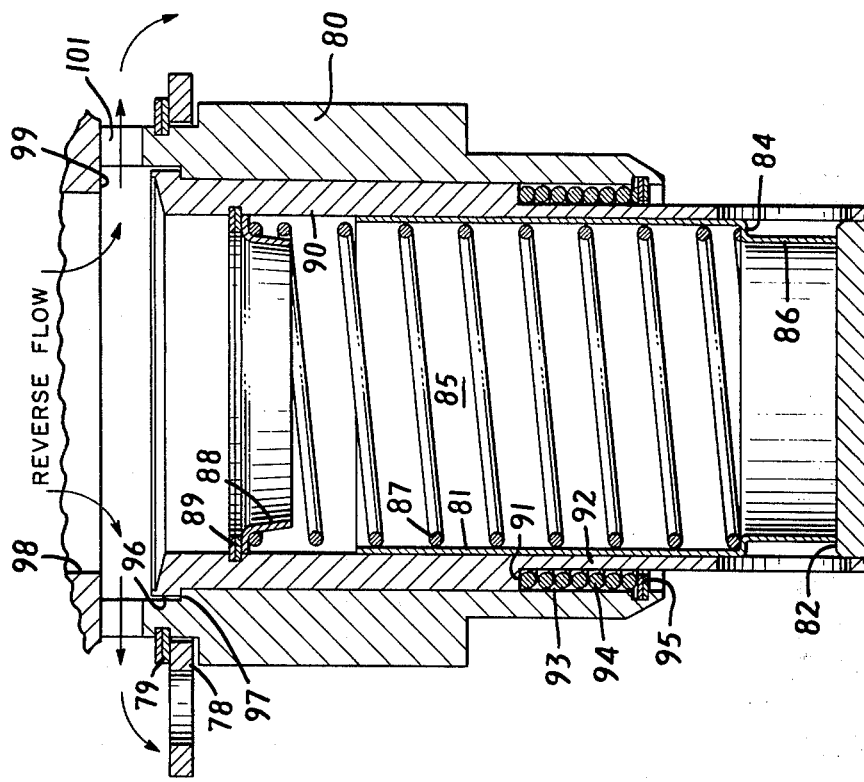
FIG. 8 is another view of the valve of FIG. 7, showing the valve position during return flow.
Figure 7:
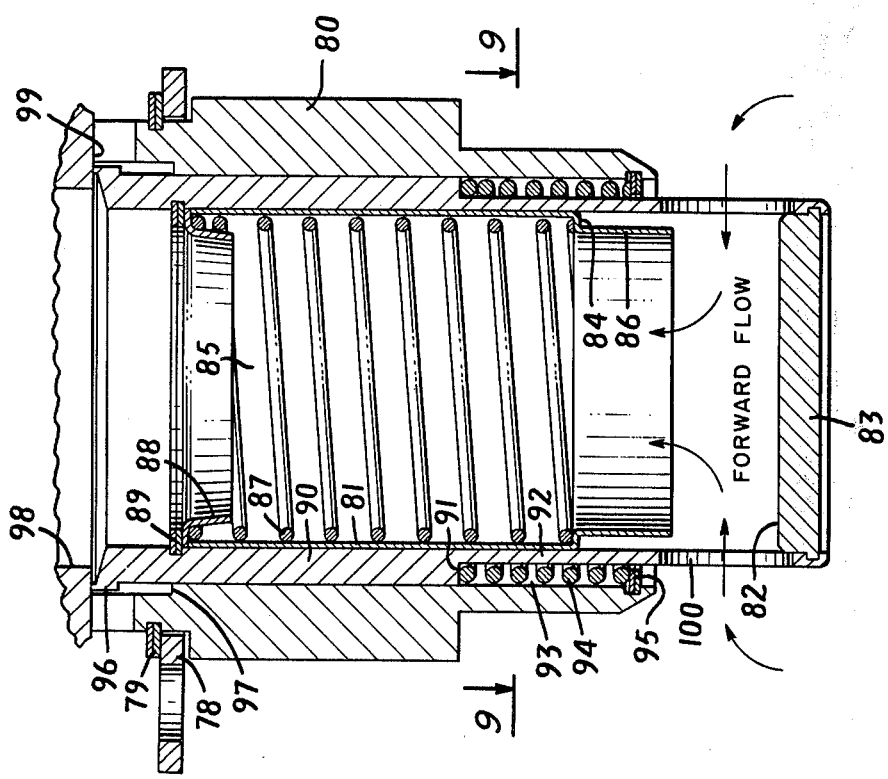
FIG. 7 is a view in longitudinal section through another embodiment of coaxial valve of the invention, providing for forward and return flow, but not relief flow; and showing the valve position during forward flow.
Figure 10:
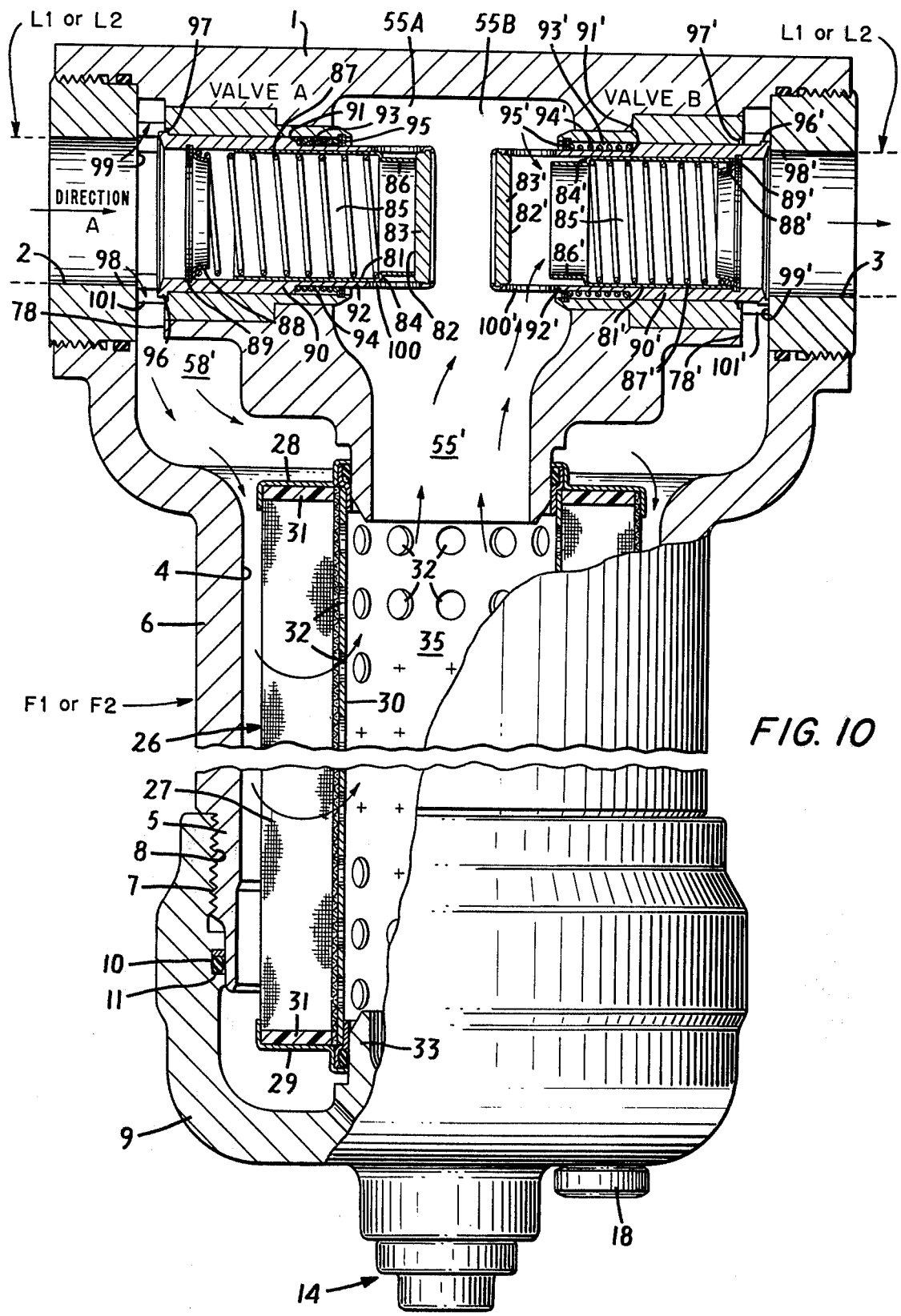
Figure 11:
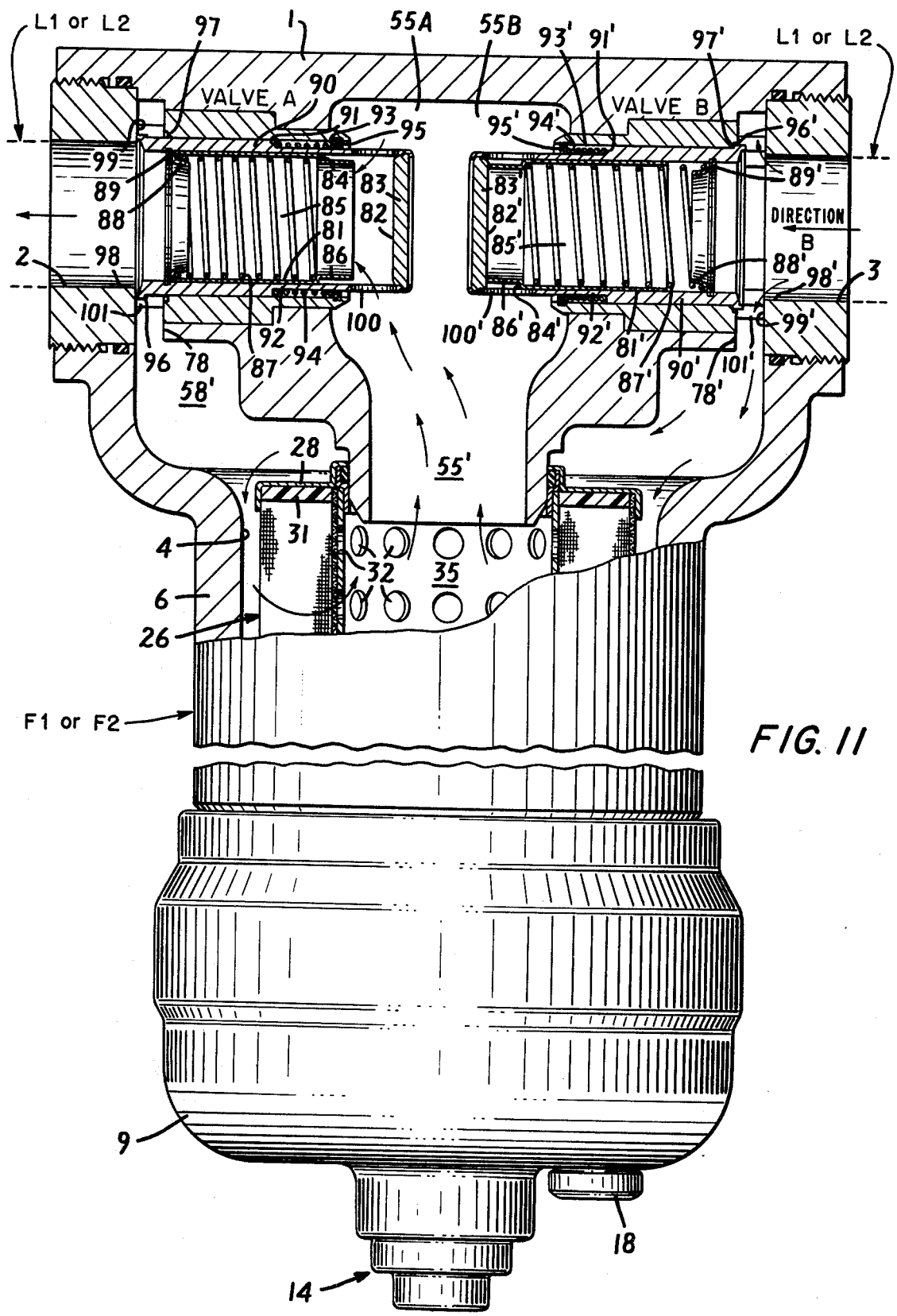

FIG. 10 is a view in longitudinal section through another embodiment of filter assembly provided with two coaxial valves as shown in FIGS. 7 to 9 for flow in the same direction through the filter during either direction of flow through the fluid line; and showing the valve positions during flow in one direction; and FIG. 11 is another view of the filter assembly of FIG. 10, showing the valve positions during flow in the other direction.

The tubular valve housing has an internal bearing surface or track along which the valve elements travel during their reciprocating movement between their open and closed positions. The bearing surface or track can be an internal wall of the housing, along which the valve elements can move. Alternatively, a bearing insert or sleeve can be placed within the housing, to serve as a valve element track. Such a surface if porous will be self-lubricating due to the fluid passing through the system filling the pores of the surface or sleeve.

For convenience and ease of manufacture, the tubular housing and/or the track are cylindrical, and the valve elements are also cylindrical, and coaxial therewith. However, any other cross-sectional configuration can be used such as square, triangular, or polygonal. Configurations not round constrain the valve elements to reciprocating movement, and prevent rotation, which is desirable in some systems.

The valve elements have an external configuration matching the bearing surface or track within the tubular housing, for reciprocating movement therealong between their limiting positions. The length of movement of the valve elements is in no way critical, and the bearing surface or track is long enough to accomodate such movement.

Normally, although not necessarily, the valve elements are tubular, and each has a central passage therethrough for normal fluid flow. In this form, the relief valve is particularly adapted for use in a filter assembly, in which the valve can be placed within the internal core of a tubular or cylindrical filter element, thus saving space. Such an open central passage can be closed off wholly or partially, as desired, according to the system requirements. It can for example be closed off by a check valve, which opens to fluid flow only in one direction therethrough, to prevent backflow.

Each tubular valve element is provided with an annular pressure-receiving surface between two portions of differing diameter which receives fluid pressure on each side thereof, and thus registers differential fluid pressure thereacross. The valve element is operatively connected to the pressure receiving surface in a manner to be urged in one direction, towards either the open or the closed position as desired. The pressure receiving surface should have a differential pressure-receiving area sufficient to overcome the biasing force of the bias means and move the valve element in this direction.

Such a pressure surface is usefully formed in a tubular valve element as a ledge on the tube extending all or only part of the way around the tube, and leading to a portion of larger or lesser diameter. It is also possible to provide one or more projecting vanes or flanges along the periphery of the valve elements. A sealing element or ring operatively connected to the valve elements at their periphery can serve as a pressure surface.

Normally, the valve elements are arranged to move in opposite directions to an open position, under the impulse of the pressure receiving surface, but they can be arranged to move in the same direction. When opening, the valve elements can expose the same or different passages, for bypass of a filter element, or for other purposes. The valve opening can extend over all or part of the circumference of the valve elements, according to the flow required.

The exterior of the valve elements can be made to fit with a close clearance against a bearing surface or track of the tubular housing, or the external valve element of a coaxial pair. The clearance can be sufficiently close so that a leak-tight seal is formed therebetween, preventing leakage past the relief valve.

It is also possible to interpose a sealing element between the exterior of the valve element and the bearing surface or track. Such a sealing element can be fixed to the wall of the tubular housing or to the valve element; in the former it is stationary, and in the latter it reciprocates with the valve element. It has, however, been found desirable to provide a sealing element which is not fixed to either, but which floats freely in the space between the valve element and the bearing surface or track of the tubular housing. The sealing element in this case can slide or rotate within this space as the valve element reciprocates along the track, reducing friction and thereby the differential pressure forces required to move the valve element. The floating sealing element can serve as the pressure receiving surface to reciprocate the valve element, even though it may move along the valve element as it transmits reciprocating force thereto sufficient to drive the element in one direction or the other.

One or several bias means is provided tending to move each valve element towards or away from its valve seat, and opposed to the direction of movement of the valve under the force applied by differential fluid pressure at the pressure receiving surface. A single means biasing both valve elements can be used, or separate bias means for each valve element. The bias means resists movement of the valve element towards or away from its valve seat under differential fluid pressures up to a predetermined minimum; at higher differential fluid pressures, the force applied to the pressure receiving surface exceeds the biasing force of the bias means, and compels movement of the valve in the opposite direction. In one such direction, the valve is moved to a closed position, and in the other such direction, the valve is moved to the open position. Thus, the valve can be arranged to open or to close under such predetermined differential fluid pressure.

The bias means can take any form. A compression or tension spring is easily fitted in the central passage of one tubular valve member such as between the two valve members without materially obstructing the open space available for fluid flow. Magnetic elements can also be used, arranged either to attract or to repel one another, one magnetic element being movable with the valve element, and one being a fixed location in the tubular housing at which it attracts or repels the element towards or away from the valve seat. In all forms, the bias means impels movement of the valve element in a direction opposed to the direction of the application of the actuating differential fluid pressure on the pressure receiving surface. A combination of spring bias and magnetic bias means can also be used.

It is usually convenient to place the relief flow passage at one end of or through the tubular housing, extending laterally to the valve element. If the former, one valve element can be arranged to move towards or away from a valve seat at one end thereof. If the latter, the relief flow passage is arranged to pass directly through both the valve elements and the tubular housing, and is opened only upon the registration of apertures at predetermined reciprocable positions of the valve elements with respect to the tubular housing.

The coaxial valves of the invention are particularly adapted for use in hydrostat systems to control flow or to control bypass of filter assemblies, where as previously indicated the valve can be positioned within the internal core of a tubular filter element. If the filter element is retained within a filter housing, the tubular valve housing can be attached to the filter housing, and the filter element attached to the tubular valve housing. For example, one filter end cap can be made with a central aperture that fits snugly over the exterior of the tubular valve housing in a press fit, and a fluid-tight seal therebetween. The coaxial valve thus can retain the filter element in a desired position in the housing, and the press fit makes it possible to quickly change filter elements without in any way interfering with the attachment of the coaxial valve to the housing. Other arrangements are also possible, however. For instance, the coaxial valve can be mounted and retained solely within the filter core, and attached or removed from the filter housing together with the filter element, the filter element being mounted to the housing in conventional manner.

The coaxial valves of the invention can be made of any suitable materials, such as plastic or metal. Stainless steel is a particularly durable material of construction, suitable for most uses, especially in filter elements, because of resistance to attack by fluids, and is preferred both for the valve element and for the tubular valve housing and other components of the coaxial valve. It is, however, also suitable to make the coaxial valve of plastic, such as polytetrafluoroethylene, nylon, polycarbonates, phenolformaldehyde, urea-formaldehyde, or melamine-formaldehyde resins. It is also suitable to fabricate the valve housing and valve element of stainless steel, and interpose a durable plastic sleeve or insert therebetween as a track, such as, for example, polytetrafluoroethylene or nylon.

A particularly advantageous feature of the coaxial valves of the invention is that their construction makes it possible to use sheet metal for the tubular housing and internal sleeve, and for the valve elements. This considerably simplifies their fabrication, and reduces manufacturing costs, as compared to other types of valves in which machined, extruded, or cast components are necessary.

Specific embodiments of the invention are illustrated in the drawings, which will now be described.

Figure 1:
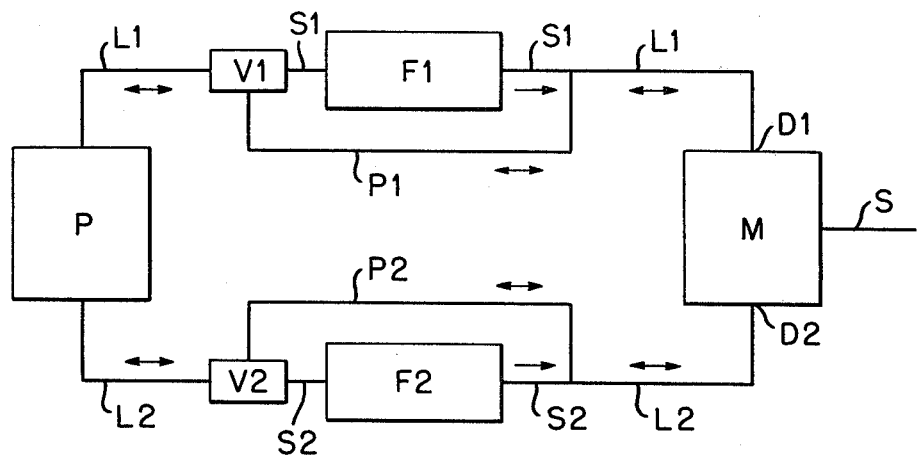

The hydrostat system of FIG. 1 is a typical closed-circuit-flow-path system, with a pump P and a motor M interconnected by two fluid lines L1 and L2. Line L1 enters the motor in a position D1 to drive or rotate the motor in one direction and line L2 enters the motor in an opposite position D2 to drive or rotate the motor in the opposite direction. In one direction, the motor drives the system forward via drive shaft S, rotating in one direction. In the opposite direction, the motor drives the system in reverse via drive shaft S rotating in the opposite direction. Thus, fluid pumped by the pump P through the line L1 to the motor M drives the system in one direction, such as forward, and fluid pumped by the pump P through the line L2 to the motor M drives the system in the opposite direction, such as in reverse.

In each line L1 and L2 there is a filter F1 and F2, and a valve of the invention V1 and V2. Two lines S1 and P1, S2 and P2, interconnect the valves V1 and V2 in series and in parallel, respectively, with the filters F1 and F2, so that flow proceeds through the filter F1, F2 or bypassing the filter, but not both. When flow is in the direction from the pump to the motor in either line L1 or L2, the flow is via series line S1, S2 through the filter, and when flow is in the direction from the motor to the pump in either line L1 or L2, the flow is via parallel line P1, P2 bypassing the filter. Since fluid proceeds from the pump to the motor in one line and returns from the motor to the pump in the other line, the flow is either via L1, S1, F1 to the motor, and via L2, P2, to the pump, or via L2, S2, F2 to the motor and via L1, P1 to the pump.

In operation, when flow proceeds forward, from the pump to the motor, in line L1, the valve V1 in response to the resulting fluid pressure differential in the forward direction opens line S1 and flow proceeds via the filter F1 to the motor M. Return flow via line L2 to valve V2 causes valve V2 in response to the resulting fluid pressure differential in the return direction to close line S2 and open line P2, so that return flow proceeds via line P2, bypassing the filter F2 to the pump.

A reversal of the pump reverses the direction of flow, so that flow now proceeds from the pump via line L2 to the valve V2. In response to the resulting fluid pressure differential in the forward direction valve V2 opens line S2 and closes line P2, so that flow proceeds via filter F2 to the motor. Return flow via line L1 causes valve V1 in response to the resulting fluid pressure differential in the return direction to open line P1 and close line S1, so that flow bypasses filter F1 to the pump.

In the event that the filter F1 and/or F2 becomes clogged, the fluid pressure differential across the valve V1 and/or V2 increases, when flow proceeds in the forward direction, until eventually the fluid pressure differential is reached at which the valve opens the parallel line P1 and/or P2 for flow bypassing the filter and relieving the fluid pressure differential.

The filter assemblies F1, F2 of FIG. 1, connected to lines L1 or L2, and shown in detail in FIGS. 2 to 6, each include a housing 1 having an inlet port 2 and an outlet port 3, communicating via chamber 4 across the coaxial valves of the invention V1 or V2. The chamber 4 is generally cylindrical in configuration, with the inlet port opening into it at an angle of 90° from the outlet port. The housing portion 6 defines the chamber 4, and is open at the end of the chamber 4 opposite the outlet port. The portion 6 of the housing terminates in a cylindrical threaded support 5 for a bowl 9. The threads 7 of the support 5 engage mating threads 8 on the inner wall of the bowl 9. An O-ring 10 and back-up ring 10' in recess 11 in the bowl 9 provide a leak-tight seal between the bowl 9 and the support 5.

The central portion of the bowl 9 has a through bore 13 serving as a socket for a differential pressure indicator 14, and a second side bore 17 serving as an outlet or drain port in which is threadably mounted the drain plug 18. Two O-rings 15 provide a leak-tight seal between the differential pressure indicator 14 and the bore 13. An O-ring 16 on a circumferential groove of the plug 18 provides a leak-tight seal between the plug 18 and the bore 17. The heads of plug 18 and differential pressure indicator 14 are hexagonal, to facilitate their insertion and removal in the bores.

Centrally disposed in the open chamber 4 within housing portion 6 is a filter element 26 composed of a corrugated cylindrical filter 27, suitably of stainless steel wire mesh of suitable pore size, for example 300 mesh, or a microporous multilayer element having a paper substrate in accordance with U.S. Pat. No. 3,353,682, dated Nov. 21, 1967 to David B. Pall and Cyril A. Keedwell, supported on an internal core 30 of cylindrical perforated stainless steel having through openings 32 for fluid flow, both filter and core being confined between end caps 28 and 29. The ends of the filter element and core are sealed in a leak-tight manner to the end caps by the potting compound 31.

The end cap 29 has a central opening 25 closed off by nipple 33 of the bowl 9, which closes off the open central passage 35 within the core at that end, sealed in a leak-tight manner by O-ring 34, captured by flange 41. The end cap 28 has a central opening 36, and is fitted with a flange 37 surrounding the opening and defining an internal groove 38 within which is captured an O-ring 39. The O-ring 39 provides a fluid-tight seal against the sleeve 40.

The sleeve 40 is a strip of stainless steel sheet pressed to form a central tubular portion over which the filter element end cap 28 fits, and an outwardly-turned flanged portion 42 which is securely attached by screws 49 between the ring 43 and plate 44 to the portion 45 of the housing 1. The central portion of the sleeve 40 extends over a sufficiently long reach so that the filter element is prevented from being withdrawn therefrom when the bowl 9 is in place, as shown in the FIGURES. On the other hand, the filter element 26 is prevented from moving too far in the other direction, towards the dependent portion 45 of the housing, by the filter element stop 46, which is an outwardly projecting flange on an external sleeve 47 fitting over sleeve 40 in a press fit.

Figure 3:
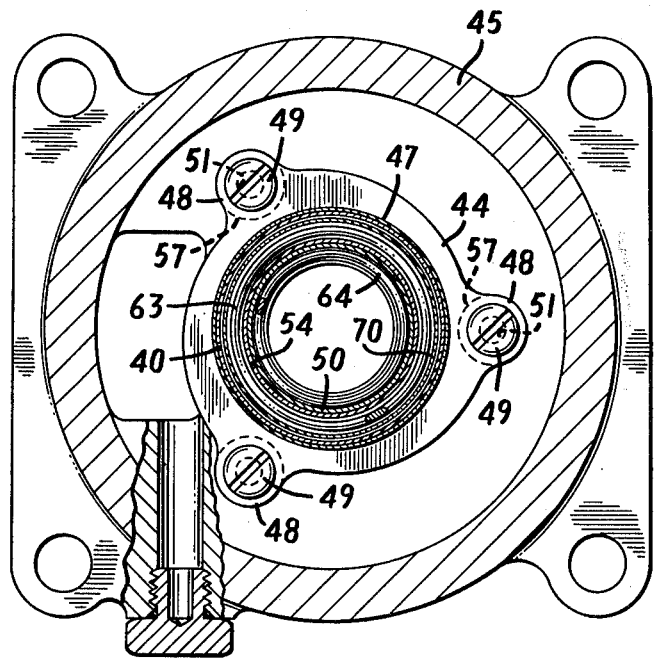
FIG. 3 is a cross-sectional view taken along the line 2—2 of FIG. 2, and looking in the direction of the arrows.

As best seen in FIG. 3, the plate 44 has three fingers provided with openings 51 through which are threaded screws 49' of the dependent portion 45 of the housing. Annular spacer rings 57 fit within recess 58 at the inner face of the housing portion 45, and have holes 59 for the screws 49. The plate is held to the housing against the rings 57 by the screws 49.

Figure 2:
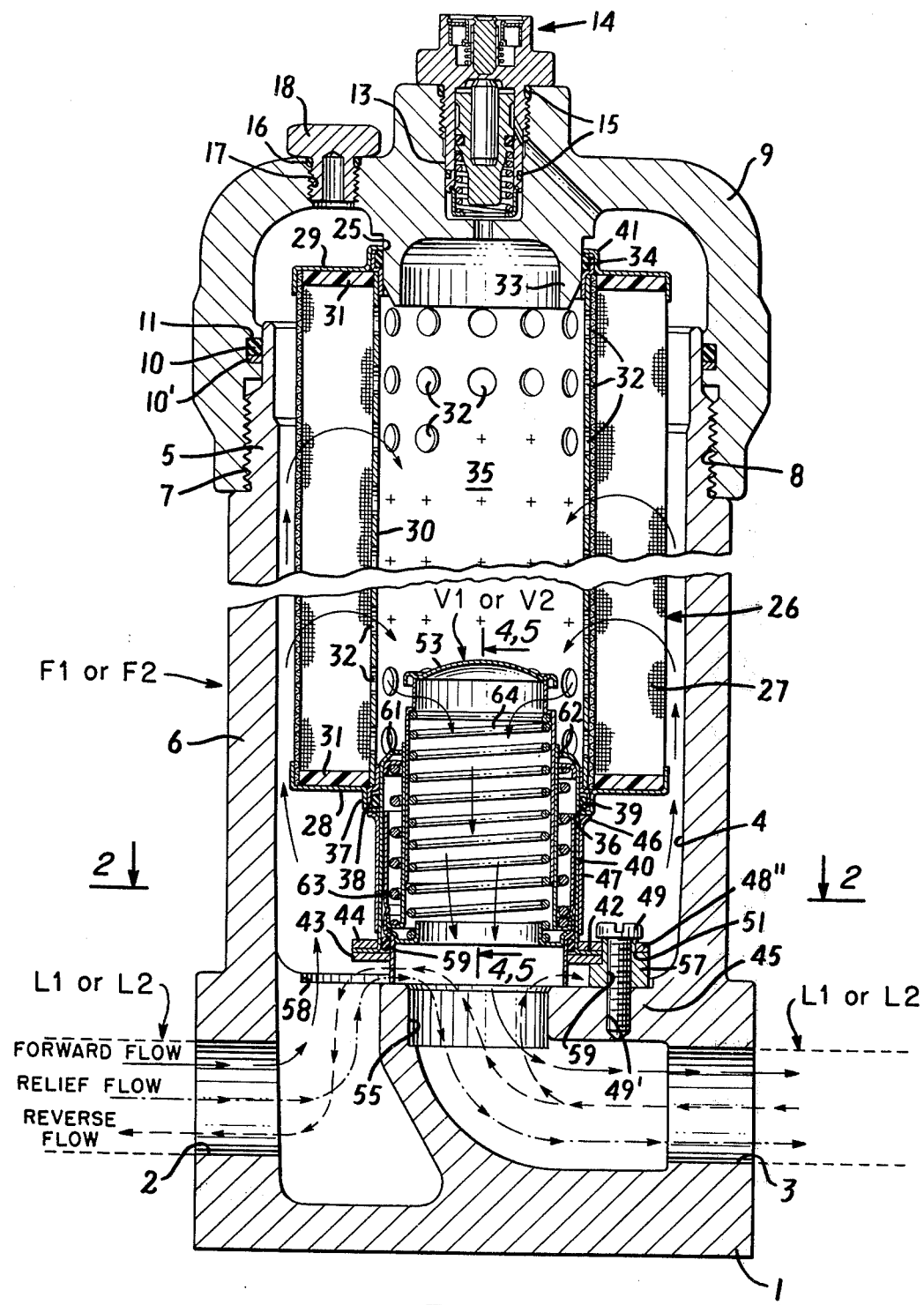

As best seen in FIG. 2, the dependent portion 45 of the housing has a through bore 55 in fluid flow communication with the outlet port 3 and the chamber 4 of the housing. The bore 55 is drilled out in a portion of wider diameter constituting the recess 58. The plate 44 and ring 43 are attached to the housing across the recess 58 and the bore 55.

Figure 4:
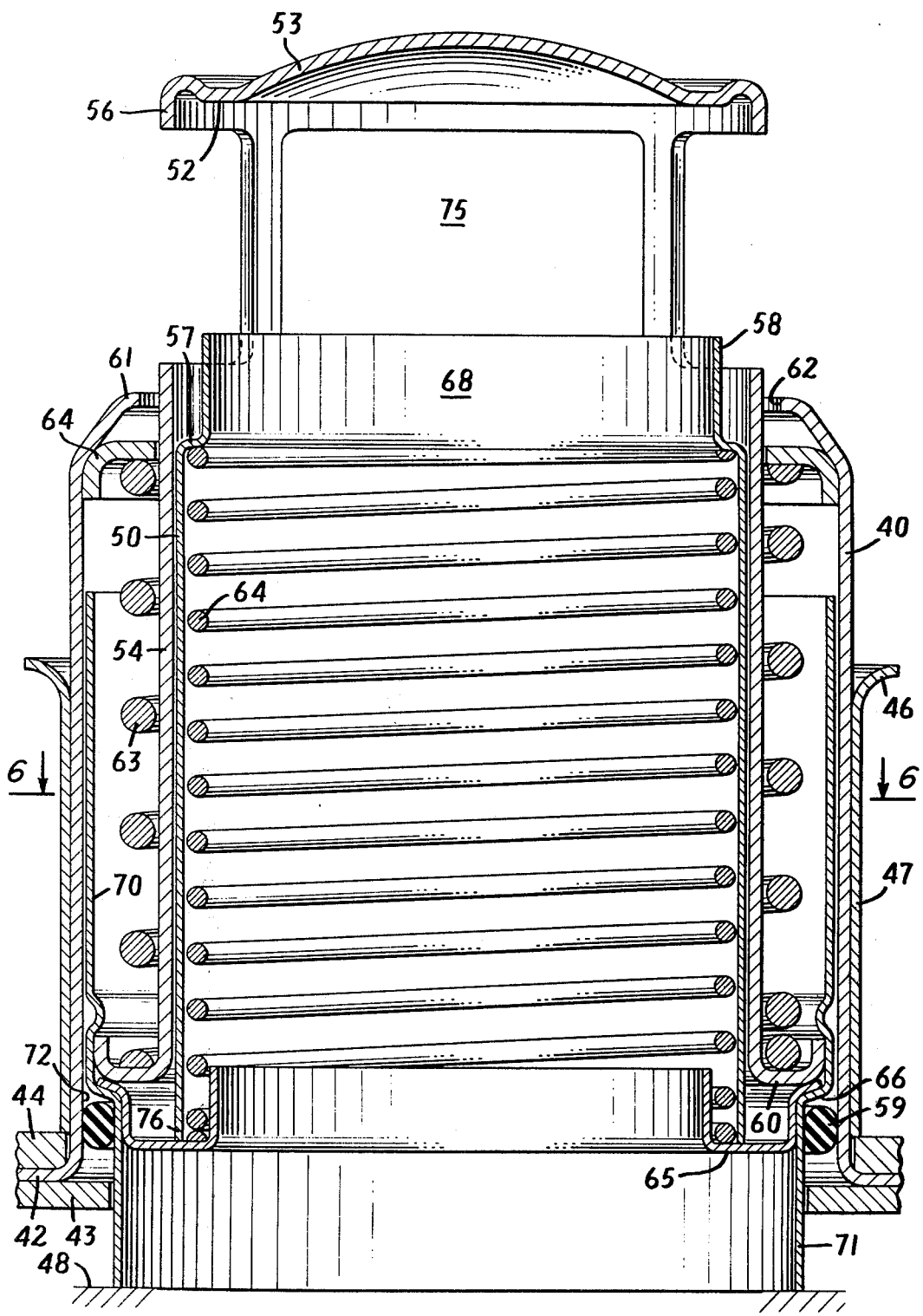
FIG. 4 is a view in longitudinal section taken along the line 4—4 through the filter assembly of FIG. 2, showing the first valve element in the normally open position, for filtered flow through the filter element, when the flow is in the normal forward direction, and the second valve element is closed.
Figure 5:
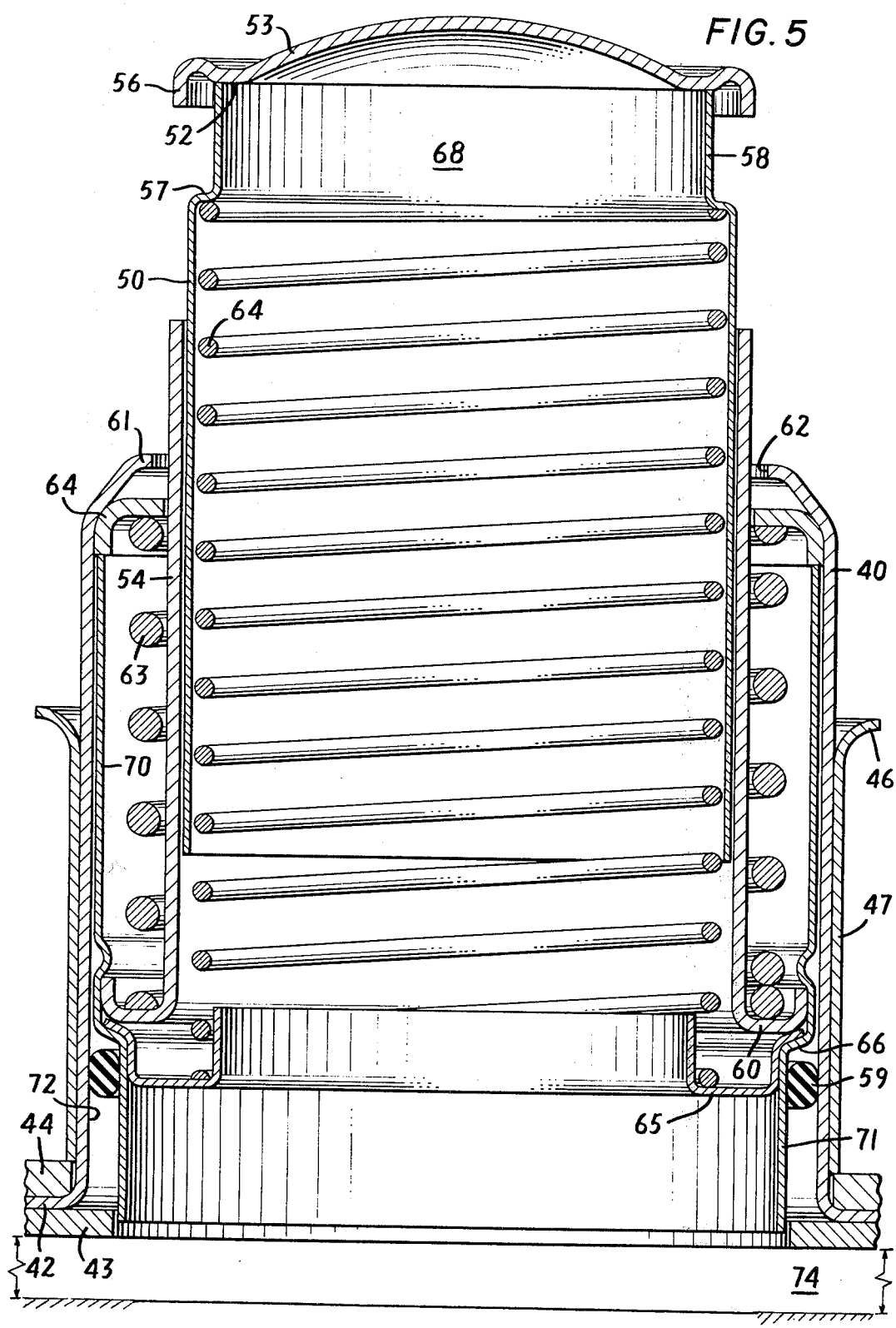
FIG. 5 is a view in longitudinal section, taken aong the line 5—5 through the filter assembly of FIG. 2, showing the first valve element closed, and the second valve element in the open position to bypass the filter element, when the flow is either in the forward direction, with the filter clogged, or in the reverse direction.
Figure 6:
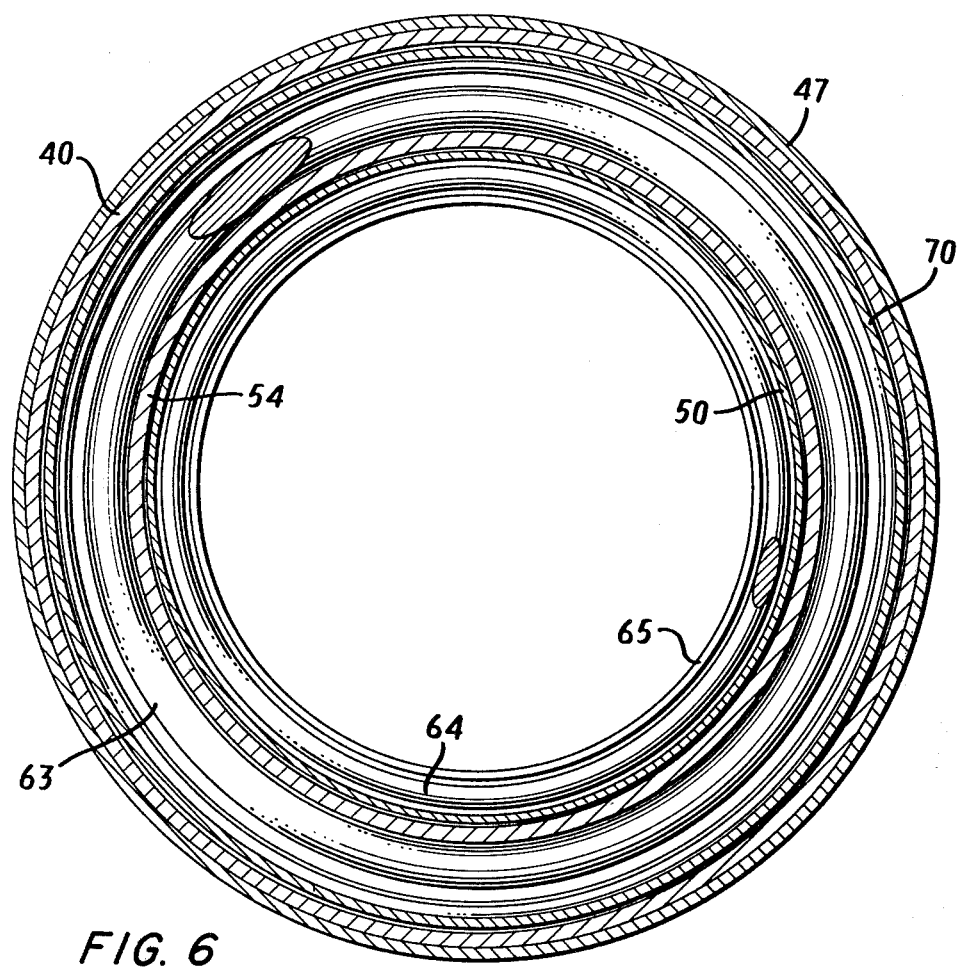
FIG. 6 is a cross-section through the valve element of FIGS. 4 and 5 taken along the line 6—6 of FIG. 4 and looking in the direction of the arrows.

The sleeve 40 constitutes a tubular housing for the coaxial bidirectional flow control and relief valve V1 or V2, best seen in FIGS. 4 to 6.

The valve has a first tubular valve element 50 movable therewithin between open and closed positions away from and towards a valve seat 52 on cap 53, which closes off the open central passage 55 through the valve and is attached to sleeve 54. The valve element 50 is normally in the closed position, but opens under forward fluid pressure during forward flow in line L1 or L2 from pump P to motor M through the filter element 26, from inlet 2 to outlet 3. Both the tubular valve housing and the tubular valve element are made of stainless steel.

A second tubular valve element 70, which is also normally in the closed position but opens under abnormal differential pressure under forward flow through the filter element or under reverse flow differential pressure in the opposite direction, is retained within the sleeve 40 by the ring 43. This element is free to move within the sleeve 40 between positions towards and away from the housing portion 45, into and away from sealing contact with valve seat 48 on the surface of housing portion 45, within recess 58.

The sleeve 40 at its bowl-end is provided with an inwardly-turned flange 61 defining a central opening 62. The flange 61 serves as a seat for the spring-bias means 63, in this case a compression spring of tempered steel, supporting a spring-retaining ring 64' which supports one end of the compression spring 63. The outer end of the spring 63 bears against the flange 60 of sleeve 54. To the other side of flange 60 is attached, as by welding, swaging, soldering, or brazing, the retaining ring 65, which bears against the ledge 66 of valve element 70.

The ledge 66 of valve element 70 leads to an end portion 71 of reduced diameter, thus defining a space 72 between the exterior of the valve element 70 and the interior of the tubular valve housing 40. Within this space is captured an O-ring 59, which is free to slide or rotate within the space 72, with movement of the valve element 70 in either direction. Normally, however, the O-ring is retained as shown in FIGS. 4 and 5 against the exterior of the ledge 66 of the valve element 70.

The valve element 50 also has a ledge 57 leading to an end portion 58 of reduced diameter at the valve seat 52. This enables the element end 58 to clear the flange 56 of the cap 53, and seat on valve seat 52. On the interior face of ledge 57 is supported one end of a second compression spring 64, the other end of which is retained against the inside face of retaining ring 65.

Thus, under the biasing force of springs 64, 63 each valve element 50, 70, respectively, seats at one end 58, 71 against a valve seat 52, 48, respectively, at one limiting position. In the other limiting position, the valve element 50, 70 has moved away from the valve seat 52, 48, respectively, exposing a passage 75, 74, respectively, for fluid flow upon such movement. These movements of the valve elements 50, 70 are controlled by differential fluid pressure against the biasing forces of the springs 63, 64, respectively, as will now be seen.

The outside face of ledge 66 of the valve element 70 and the O-ring 59 are exposed to fluid pressure on the pump side of the valve, in chamber 4, in the forward flow direction from the pump to the motor. The inner face of ledge 66 is exposed to fluid pressure on the motor side of the valve, in open central passages 35 and 68 of the filter element and valve, respectively. During the forward flow from pump to motor, the fluid pressure in chamber 4 is greater than that in bore 55, and the resulting differential pressure across the valve tends to move the valve element 70 away from the seat 48. Such movement is resisted by the spring 63, which biases the valve element towards that seat, up to a predetermined minimum forward differential fluid pressure. When the force arising from differential fluid pressure applied at the O-ring 59 and ledge 66 exceeds the biasing force of the spring, the valve element 70 moves away from the seat 48, thereby exposing the passage 74 to fluid flow, bypassing the filter element 26. This occurs when fluid flow proceeds in the forward direction from pump P through line L1 to L2 towards the motor M through chamber 4, through the filter element 26, towards the outlet port 3 via central passages 35 and 68.

The valve element 70 also is arranged to open during reverse fluid flow proceeding from motor M through line L1 or L2 to outlet port 3 and bore 55 to inlet port 2, and thence to the pump. It is desired when reverse fluid flow proceeds through line L1 or L2 that the filter element F1 or F2 be bypassed, so as to avoid unloading the contaminants on the upstream side of the filter element 27. Such opening of the valve V1 or V2 is accomplished due to return differential fluid pressure across the valve under reverse fluid flow. The inner faces of cap 53 and flange 60 of sleeve 54 are exposed to fluid pressure in passage 68, and the outer faces of the cap 53 and flange 60 are exposed to fluid pressure in chamber 4. The valve thus can respond to reverse differential fluid pressure under reverse flow towards chamber 4 from outlet 3, tending to force the cap 53 and sleeve 54 and with them spring 63 and valve element 70 away from the valve seat 48. Under reverse fluid flow, fluid pressure in space 68 within the valve element 50 against the ledge 57 is greater than fluid pressure on the outer side of valve element 50 against ledge 57. Compression spring 64 normally holds the valve element 50 in the closed position, and there is no force tending to open valve 50, which remains closed. Thus, fluid pressure in space 68 is exerted against cap 53 on ledge 60. The biasing force of the spring 63 is quickly exceeded by the differential fluid pressure arising across the cap 53 and ledge 60, and the sleeve 54 and valve element 70 with it move from the closed to the open position, away from valve seat 48, thus opening passage 74 to reverse fluid flow, bypassing the filter element.

Operation of the filter assembly and coaxial valve is as follows: Under forward flow, fluid enters the filter housing 1 from line L1 or L2 via the inlet port 2, proceeds into the chamber 4, and thence through the filter element 26 towards the motor, while contaminants and other suspended solid materials are filtered out. The filtered fluid passes through the perforations 32 in the core 30, into the open passage 35 in the interior of the core. The valve element 50, under forward differential fluid pressure across the valve sufficient to exceed the bias force of spring 64, has moved away from valve seat 52, exposing passage 75, and so flow proceeds from passage 35 through the passage 75 between cap 53 and valve element 50 into the interior passage 68 through the valve element 50 and bore 55 to the outlet port 3 of the housing 1, and thence via line L1 or L2 to the motor.

As the flow continues, the filter element 26 gradually becomes loaded with contaminants, and flow through the element is decreased. As the filter element increasingly becomes incapable of passing normal fluid flow, the pressure differential across the filter element increases, with the result that the differential pressure on the O-ring 59 ledge 66 of the valve element 70 increases. At a differential pressure just before the valve crack-open differential pressure, the differential pressure indicator 14 is triggered, and a signal given. The filter element should then be changed. If it is not, the differential pressure continues to increase. Eventually the differential pressure against O-ring 59 and ledge 66 reaches the crack-open pressure, and exceeds the resistance of the spring 63, pushing the valve element 70 away from seat 48 and opening passage 74 for relief flow bypassing the filter element 26, and this flow continues until the condition is corrected or the filter element is changed. Valve element 50 remains open, if the differential pressure thereacross remains high enough to exceed the biasing force of spring 64; if it does not, it closes, but bypassing flow via passage 74 and open valve 70 can continue, despite this.

In the event that the filter element 26 is to be replaced, flow is shut off. The bowl 9 can then be withdrawn on the threads 7, 8 exposing the filter element 26. The valve elements 50, 70, are closed, so drain back of fluid from line L1, L2 to the motor is prevented. Since the filter element 26 is attached over the sleeve 40 in a press fit, it is easily slipped on, and a fresh filter element substituted. The bowl 9 can then be replaced. In order to avoid introduction of air into the system, it may be desirable to fill the bowl 9 with fluid before replacing it.

In the event that fluid flow through the line L1 or L2 and filter assembly F1 or F2 is reversed, the coaxial valve ensures that reverse flow will not proceed through and unload the filter element 26. Immediately that reverse flow begins, the differential fluid pressure across valve element 50 is reversed, and now bears on ledge 57 to drive the element 50 closed, against valve seat 52. This closes off the flow through passage 75, whereupon the reverse flow differential fluid pressure across the cap 53, sleeve 54 and valve element 70 increases, to a force sufficient to overcome the biasing force of spring 63, and sleeve 54 and with it valve element 70 are then moved away from valve seat 48, opening passage 74 to return flow bypassing the filter 26 into chamber 24.

This situation continues while reverse flow continues. When reverse flow ceases, the differential fluid pressure holding the cap 53, sleeve 54 and valve element 40 open drops to zero, and spring 63 brings the valve element 70 to valve seat 48, closing the valve. Valve element 50 continues to be closed, since there is no flow. The coaxial valve is now ready to accept forward flow. If forward flow is resumed, valve element 50 opens, as before.

It will be apparent from FIGS. 4 and 5 that when the valve element 70 moves to the open position, it carries with it valve element 50, since ring 65 bears against the end 76 of the element 50. However, valve 70 moves only a relatively short distance axially to open (see FIG. 5), and at the open position ring 65 does not quite drive valve element 50 to the closed position; it remains partially open, to accept such filtered flow as may pass through the filter element 26. However, if desired, the valve element 50 can be arranged to be closed when valve element 70 is open, merely by making the distance traveled by each valve the same, between open and closed positions. Alternatively, by shortening the valve element 50, it can be made so as not to be engaged by ring 65, whatever the position of valve element 50.

The embodiment of coaxial bidirectional flow control valve of the invention shown in FIGS. 7 to 9 has a sleeve 80 which constitutes a tubular housing.

A first tubular valve element 81 is movable within a second tubular valve element 90, coaxial therewith, between open and closed positions away from and towards a valve seat 82 on cap 83, which closes off the open central passage 85 through the valve, and is attached to the second valve element 90. The valve element 81 is normally in the closed position shown in FIG. 8, but opens under forward differential fluid pressure across the valve during forward flow applied at the ledge 84 of the valve element. Both the tubular valve housing 80 and the tubular valve elements 81, 90 are made of heat-treated steel.

The second tubular valve element 90 is normally in the closed position shown in FIG. 7, but opens under reverse differential pressure during reverse flow. The valve element is retained within the sleeve 80 by the flange 96, seating on ledge 97 of the sleeve when the valve is in the open position shown in FIG. 8. This element is free to move within the sleeve 80 between positions towards and away from the housing portion 98, into and away from sealing contact with valve seat 99 on the surface of housing portion 98.

The ledge 91 of valve element 90 leads to an end portion 92 of reduced external diameter, thus defining a space 93 between the exterior of the valve element 90 and the interior of the tubular valve housing 80. Within this space is fitted a coil spring 94, which is retained therein by the lock ring 95. The spring 94 biases the valve element 90 against the seat 99 on the housing portion 98.

The valve element 81 has a ledge 84 leading to an end portion 86 of reduced diameter seating at the valve seat 82. The interior face of ledge 84 serves as a retaining support for the coil spring 87, the other end of which is retained against the inside face of the flanged ring 88, seated on retaining ring 89 seated in valve element 90. The spring 87 retains the valve element 81 against the valve seat 82.

Thus, under the biasing force of springs 87, 94 each valve element 81, 90, respectively, seats at one end against a valve seat 82, 99, respectively, at one limiting position. In the other limiting position, the valve element 81, 90 is moved away from the valve seat 89, 99, respectively, exposing a passage 100, 101, respectively, for fluid flow upon such movement. These movements of the valve element 81, 90 are controlled by differential fluid pressure against the biasing forces of the springs 87, 94, respectively.

The valve elements 81, 90 are coaxial, and each is reciprocable within and over the other, respectively, independently and without regard to whether the other is stationary. The two elements are fitted snugly together in a leak-tight fit, so that no supplemental sealing is necessary, even at relatively high differential fluid pressures thereacross. In like manner, valve element 90 is reciprocable within sleeve 80, and is fitted snugly therewithin in a leak-tight fit.

The sleeve 80 is retained in a fixed position relative to the housing portion 78 by the retaining ring 79.

The outside face of ledge 84 of valve element 81 is exposed to fluid pressure on the one side, for example, the pump side, of the valve, and the inner face of the ledge is exposed to fluid pressure on the other side, for example, the motor side, for the valve.

The inside face of cap 83 and the outside face of flange 96 of the valve element 90 are exposed to fluid pressure on the other side, the motor side, of the valve. The outer face of ledge 91 is exposed to fluid pressure on the first side of the valve. During forward flow, from pump to motor, the fluid pressure on the pump side of valve 81 is greater than on the motor side, and the resulting differential pressure across the valve applied at ledge 84 tends to move the valve element 81 away from the seat 82. Such movement is resisted by the spring 87, which biases the valve element towards that seat, up to a predetermined minimum forward differential fluid pressure. When the force arising from differential fluid pressure applied at the ledge 84 exceeds the biasing force of the spring, the valve element 81 moves away from the seat 82, thereby exposing the passage 100 to find flow. This position of the valve continues while fluid flow proceeds in the forward direction.

The valve element 90 is arranged to open during reverse fluid flow, for example, from the motor proceeding to the pump. During reverse flow, the inside face of cap 83 and the outside face of flange 96 are exposed to reverse fluid pressure on the motor side of the valve, and the outer face of the ledge 91 is exposed to fluid pressure on the pump side of the valve. The valve 90 thus can respond to return differential fluid pressure under reverse flow tending to force the valve element 90 away from the valve seat 99. Under reverse fluid flow, fluid pressure against the inside face of cap 83 and the ledge 96 is greater than fluid pressure on the other side of the valve element 90 against ledge 91. Compression spring 94 normally holds the valve element 90 in the closed position, and there is no force tending to open valve 81 which remains closed. Thus, reverse fluid pressure is exerted against cap 83 and ledge 96. The biasing force of the spring 94 is quickly exceeded by the differential fluid pressure arising across the cap 83 and ledge 96, and the valve element 90 moves from the closed to the open position away from valve seat 99, thus opening passage 101 to reverse fluid flow for the purpose, for example, of bypassing the filter element.

This valve has no provision for relief bypass flow.

Operation of this coaxial valve is as follows: Under forward flow, fluid approaches the valve element 81, and encounters ledge 84 while the valve element is in the closed position shown in FIG. 8. The valve element 81, under forward differential fluid pressure across the valve applied at the ledge 84 sufficient to exceed the bias force of spring 87, is moved away from valve seat 82, into the position shown in FIG. 7, exposing passage 100, and so flow proceeds through the passage 85 within valve element 81, past the valve. While flow continues in the forward direction, valve 90 remains in the closed position shown in FIG. 7.

When fluid flow through the valve is reversed, the coaxial valve ensures that reverse flow will not proceed through the passages 85, 100, but proceeds via passage 101 through another flow path. Immediately that reverse flow begins, the differential fluid pressure across valve 81 is reversed, and now bears on the inside face of ledge 84 so that there is no force to hold element 81 open and the spring 87 therefore drives the element 81 closed, against valve seat 82. This closes off the flow through passage 85, whereupon the reverse flow differential fluid pressure across the inside face of cap 83 and the outside face of flange 96 increases, to a force sufficient to overcome the biasing force of spring 94, and valve element 90 is then moved away from valve seat 99, opening passage 101 to reverse flow bypassing the line communicating with passage 100. The valve position is then as shown in FIG. 8.

This situation continues while reverse flow continues. When reverse flow ceases, the differential fluid pressure holding the cap 83, flange 96, of valve element 90 open drops to zero, and spring 94 brings the valve element 90 to valve seat 99 closing the valve. Valve element 81 continues to be closed as shown in FIG. 8, since there is no flow. The coaxial valve is now ready to accept forward flow. If forward flow is resumed, valve element 81 opens, as before.

It will be apparent from FIGS. 7 and 8 that when the valve element 90 moves to the open position, it carries with it valve element 81, since ring 89 bears against the ring 88 and cap 83 is attached to the element 90. However, valve element 81 is not opened by such movement of valve element 90.

The filter assembly of FIGS. 10 and 11 utilizes two valves A and B of FIGS. 7 to 9 in tandem, and controlling the inflow and outflow lines leading to and from the filter element so that flow in either direction proceeds in the same or normal direction through the filter. Valve A controls flow through the filter element from one flow direction A, and valve B controls flow through the filter element from the other flow direction B. FIG. 10 shows the valves A and B positions during flow in direction A, and FIG. 11 shows the valves A and B positions during flow in direction B. The two valves A and B are identical, and hence the same reference numerals are used for like parts, designated with a prime (') for valve B to distinguish them from valve A.

The filter element, housing, and bowl construction is identical to that shown in FIG. 2, and consequently like reference numerals are used for like parts. Reference to the description of FIG. 2 will clarify the structure; to avoid repetition, the following description is directed only to the portions of the structure of the device of FIGS. 10 and 11 that are different.

It will be seen from FIGS. 10 and 11 that valves A and B are placed in-line, with the open ends of each facing the fluid lines 2, 3, respectively, in the filter housing 1.

In this case, the filter housing 1 has a through bore 55' with a connecting two-legged loop 55A, 55B, leading to valve seats 82, 82' affording access to the inner open central passages 85, 85' of the valves A, B, in fluid flow communication with lines 2, 3, respectively. The inner tubular valve elements 81, 81' control flow between 55' and lines 2, 3, for fluid flow from the open central passage 35 of the filter element 26.

A second through bore 58' affords access from lines 2, 3 to the chamber 4 of the filter housing 1, and the outer tubular valve elements 90, 90' of valves A and B, sealing against valve seats 99, 99' on the surfaces 98, 98' of the housing at lines 2, 3, respectively, control flow through the bore 58' to the chamber 4.

Under flow in direction A, the outer tubular valve element 90 of valve A and the inner tubular valve element 81' of valve B open under forward differential fluid pressure across the valves during forward flow, applied at the face of flange 96 of valve element 90 and the ledge 84' of the valve element 81', into the positions shown in FIG. 10. Valve elements 81 and 90' remain closed.

Under flow in direction B, the outer tubular element 90' of valve B and the inner tubular valve element 81 of valve A open under the differential fluid pressure applied to the face of flange 96' of valve element 90' of valve B and the ledge 84 of valve element 81 of valve A, into the positions shown in FIG. 11. Compression springs 94', 87 normally hold the valve elements 90', 81 in the closed position, and there is no force tending to open valves 81', 90, which remain closed. The biasing force of the springs 94', 87 is quickly exceeded by the differential fluid pressure arising across the flange 96' and ledge 84, and the valve elements 90', 81 move from the closed to the open position away from valve seats 99', 82, again thus opening passages 58', 55' for fluid flow in the normal direction through the filter element 26, from chamber 4 to passage 35, from line 3 to line 2.

Operation of this filter assembly is as follows: Under fluid flow through lines 2, 3 in direction A, fluid approaches the valve elements 90, 81' and encounters flange face 96 and ledge 84' while the valve elements are in the closed position (not shown). The valve elements 90, 81', under forward differential fluid pressure across the valves applied at the flange 96 and ledge 84' sufficient to exceed the bias force of springs 94', 87 are moved away from valve seats 99', 82 into the position shown in FIG. 10, exposing passages 58', 55 and so flow proceeds through the filter element 26 past the valves A and B. While flow continues in direction A, valves 81', 90 remain in the closed position, shown in FIG. 10.

When fluid flow through lines 2, 3, valves A and B, is reversed, the coaxial valve ensures that flow will proceed through the filter element 26 and the passage 58', 55' in the normal direction. Immediately that the flow is reversed, and flow in direction B begins, the differential fluid pressure across valves A and B is reversed, and now bears on the outside face of flange 96' and ledge 84, and the elements 90', 81 open, and the springs 94', 87 therefore drive the elements 90, 81' closed, against valve seats 99, 82', whereupon the differential fluid pressure in flow direction B across the outside faces of flange 96' and ledge 84' increases to a force sufficient to overcome the biasing force of springs 94', 87, and valve elements 90', 81 are then moved away from valve seats 99', 82, opening the passages 58', 55' to fluid flow in the normal direction through filter element 26 but now from line 3 to line 2. The valve positions are then as shown in FIG. 11.

This situation continues while flow in direction B continues. When such flow ceases, the differential fluid pressure holding the flange 96' and ledge 84 of the valve elements 90', 81 open drops to zero, and springs 94', 87 being the valve elements 90', 81 to valve seats 99', 82, closing the valve. Valve elements 90, 81' continue to be closed, since there is no flow. The coaxial valve is now ready to accept flow in direction A. If such flow is resumed, valve elements 90, 81' open, as before.

While the embodiments shown in the drawings each have valve elements held normally in the closed position by compression springs, one or both of the valve elements can also be held normally in the open position, by tension springs, and closed under a predetermined differential pressure thereacross, exceeding a predetermined minimum. The valve can thus be made to close, to prevent pressure surges from either direction from passing through, as in reverse flow, for example, but otherwise allow flow freely in either direction. The valve can also be arranged to allow normal flow through one line in either or both directions. The valve can also be arranged to allow normal flow through one line in either or both directions, and divert pressure surges in either or both directions to another bypass line.

The valve is thus quite versatile in protecting a filter element from damage under flow from either direction or unloading from the other direction, and in controlling bypass flow past a filter element from either direction, under predetermined differential fluid pressures.

The valve of the invention is useful as a normally closed dual check valve in any system. Pressure relief path flow control from either direction can be provided by constructing either or both valve elements so as to be responsive to differential pressures from either direction, at first and second stages, each above a predetermined minimum, and independently of each other.

Having regard to the foregoing disclosure, the following is claimed as the inventive and patentable embodiments thereof:

1. A hydrostat system comprising a hydraulic pump; a hydraulic motor; a fluid line operatively connecting the pump with the motor, and arranged to carry fluid flow therebetween in either direction; a unidirectional function interposed in the fluid line between the pump and the motor, for acceptance of fluid in one direction of flow between the pump and the motor; and a coaxial multidirectional flow control valve in fluid flow connection with the fluid line and with the function, and interconnected by at least one fluid line in series flow connection with the function and at least one fluid line in parallel flow connection with the function, and controlling flow through the series and the parallel lines, the valve directing fluid flow in one direction through the function, via the line in series with the function, and fluid flow in the other direction bypassing the function, via the line in parallel with the function, sensing and responding to differential fluid pressure thereacross arising from flow of fluid in one direction, to direct fluid flow through the function and close the line bypassing the function; and sensing and responding to differential fluid pressure thereacross arising from flow of fluid in the other direction, to direct fluid flow in the other direction, to bypass the function and close the line leading to the function, the valve comprising, in combination, a tubular valve housing; first and second valve seats in the housing; first and second coaxial tubular valve elements nested concentrically and separately reciprocable within the valve housing towards and away from the first and second valve seats, respectively, between closed and open positions, to close and open first and second valve flow passages, respectively, of which one passage is in fluid flow connection with the series line and the other passage is in fluid flow connection with the parallel line; a fluid-pressure receiving surface operatively connected to each valve element, urging the first valve element in a first direction towards or away from its valve seat, and the second valve element in a second direction, towards or away from its valve seat; bias means urging each valve element in the opposite direction, the biasing force of the bias means being adjusted to resist movement of each valve element in said direction away from or towards its valve seat except under differential fluid pressure arising from flow and applied to the fluid-pressure receiving surface from the one or the other flow direction; and each of the valve elements moving in said direction towards or away from its valve seat and opening when flow begins from that direction and closing when flow stops from the direction, the first valve element being responsive to differential fluid pressure arising from flow in the one direction from one side of the valve, and the second valve element being responsive to differential fluid pressure arising from flow in the other direction from the other side of the valve, so that the valve is arranged to open or close in response to differential fluid pressure arising and applied from either direction of flow, and to direct such flow through one of the first and second valve flow passages according to flow direction, thereby directing such flow in one direction to proceed through the function, and in the other direction to bypass the function.

2. A hydrostat system according to claim 1, in which the valve elements are light in weight and reciprocate between open and closed positions within several milliseconds.

3. A hydrostat system according to claim 1 in which one of the first and second valve elements is arranged to open under differential fluid pressure arising from flow from either side of the valve.

4. A hydrostat system according to claim 1, in which the tubular valve housing has an internal wall along which the valve element reciprocates between open and closed positions.

5. A hydrostat system according to claim 3, in which the exterior of the valve element and the internal wall have a close enough clearance to define a fluid-tight seal therebetween.

6. A hydrostat system according to claim 3, in which at least a portion of the internal wall and the exterior of the valve element are spaced apart; and a sensing means is disposed within that space providing a fluid-tight seal between the wall and the valve element.

7. A hydrostat system according to claim 1, in which the bias means is a coil spring.

8. A hydrostat system according to claim 1, in which the inner of the concentric valve elements has an open central passage for flow of fluid therethrough.

9. A hydrostat system according to claim 8, in which each tubular valve element has portions of relatively large and relatively small diameter connected by a ledge providing the fluid pressure-receiving surface.

10. A hydrostat system according to claim 9, in which the portion of lesser diameter of the outer valve element defines a space with the tubular valve housing, within which is disposed a sealing means movable with reciprocation of the valve element within the space, and the portion of lesser diameter of the inner valve element defines a space with the outer valve element, within which is disposed a sealing means movable with reciprocation of the valve element within the space.

11. A hydrostat system according to claim 1, in which the bias means urges each valve element towards its valve seat, and the fluid pressure-receiving surface is operatively connected to the valve element to urge it away from its valve seat under differential fluid pressures in excess of a predetermined minimum.

12. A hydrostat system according to claim 11, in which each fluid pressure-receiving surface of each valve element is exposed to fluid pressure both upstream and downstream of the valve, and a fluid pressure differential therebetween above a predetermined minimum in one direction moves at least one valve element, overcoming the bias force of the bias means.

13. A hydrostat system according to claim 1, in which the coaxial valve has a tubular sleeve disposed between the first and second valve elements, and movable with the outer valve element, the inner valve element being reciprocable within the tubular sleeve between closed and open positions towards and away from a valve seat connected to and movable with the tubular sleeve.

14. A hydrostat system according to claim 13, in which the inner valve element of the coaxial valve is arranged in its closed position to close off a central fluid passage through the inner valve element, and in its open position to open the fluid passage through the inner valve element.

15. A hydrostat system according to claim 14, in which the tubular sleeve of the coaxial valve has a cap closing off one end, and the inner valve element seats against the cap to close the fluid passage through the inner valve element.

16. A hydrostat system comprising a hydraulic pump; a hydraulic motor; a fluid line operatively connecting the pump with the motor, and arranged to carry fluid flow therebetween in either direction; a unidirectional function interposed in the fluid line between the pump and the motor, for acceptance of fluid in one direction of flow between the pump and the motor; and two coaxial multidirectional flow control valves in fluid flow connection with the fluid line and with the function, and in series flow connection with the function upstream and downstream of the function, and controlling flow through the series line and connected with the function in either direction of the flow in the fluid line, the valves directing fluid flow in the same and normal direction through the function via the line in series with the function, one of the valves sensing and responding to a differential fluid pressure across the valve arising from one direction of the fluid flow, to direct fluid flow in the normal direction through the function, and the other valve sensing and responding to a differential fluid pressure across the valve arising from the other direction of fluid flow, to direct fluid flow in the normal direction through the function, each valve comprising, in combination, a tubular valve housing; first and second valve seats in the housing; first and second coaxial tubular valve elements nested concentrically and separately reciprocable within the valve housing towards and away from the first and second valve seats, respectively, between closed and open positions, to close and open first and second valve flow passages, respectively, of which one passage is in fluid flow connection with the series line and the other passage is in fluid flow connection with the fluid line; a fluid-pressure receiving surface operatively connected to each valve element, urging the first valve element in a first direction towards or away from its valve seat, and the second valve element in a second direction, towards or away from its valve seat; bias means urging each valve element in the opposite direction, the biasing force of the bias means being adjusted to resist movement of each valve element in said direction away from or towards its valve seat except under differential fluid pressure arising from flow and applied to the fluid-pressure receiving surface from the one or the other flow direction; and each of the valve elements moving in said direction towards or away from its valve seat and opening when flow begins from that direction and closing when flow stops from that direction, the first valve element being responsive to differential fluid-pressure arising from flow in the one direction from one side of the valve, and the second valve element being responsive to differential fluid-pressure arising from flow in the other direction from the other side of the valve, so that the valve is arranged to open or close in response to differential fluid-pressure arising and applied from either direction of flow, and to direct such flow through the passage in fluid flow connection with the function, thereby directing such flow from either direction to proceed through the function in the normal direction.

17. A hydrostat system according to claim 16, in which the function is a filter.

18. A hydrostat system according to claim 16 in which the valve elements are light in weight and reciprocate between open and closed positions within several milliseconds.

19. A hydrostat system according to claim 16 in which the tubular valve housings have an internal wall along which the valve elements reciprocate between open and closed positions.

20. A hydrostat system according to claim 16, in which the exterior of the valve element and the internal wall have a close enough clearance to define a fluid-tight seal therebetween.

21. A hydrostat system according to claim 16, in which at least a portion of the internal wall and the exterior of the valve element are spaced apart, and a sealing means is disposed within that space, providing a fluid-tight seal between the wall and the valve element.

22. A hydrostat system according to claim 16, in which the bias means is a coil spring.

23. A hydrostat system according to claim 16, in which the inner valve element has an open central passage for flow of fluid therethrough.

24. A hydrostat system according to claim 23, in which each valve element has portions of relatively large and relatively small diameter connected by a ledge providing the fluid pressure-receiving surface.

25. A hydrostat system according to claim 24, in which the portion of lesser diameter of the outer valve element defines a space with the tubular valve housing, within which is disposed a sealing means movable with reciprocation of the valve element within the space, and the portion of lesser diameter of the inner valve element defines a space with the outer valve element, within which is disposed a sealing means movable with reciprocation of the valve element within the space.

26. A hydrostat system according to claim 16, in which the bias means urges each valve element towards its valve seat, and the fluid pressure-receiving surface is operatively connected to the valve element to urge it away from its valve seat under differential fluid pressures in excess of a predetermined minimum.

27. A hydrostat system according to claim 26, in which each fluid pressure-receiving surface of each valve element is exposed to fluid pressure both upstream and downstream of the valve, and a fluid pressure differential therebetween above a predetermined minumum in one direction moves at least one valve element, overcoming the bias force of the bias means.

28. A hydrostat system according to claim 25, in which the inner valve element has a central fluid passage therethrough and is arranged in its closed position to close and in its open position to open that fluid passage.

29. A hydrostat system according to claim 28, in which the coaxial valve has a cap closing off one end, and the inner valve element seats against the cap to close the fluid passage through the inner valve element.

* * * * *

UNITED STATES PATENT OFFICE
CERTIFICATE OF CORRECTION

Patent No. 4,009,572          Dated March 1, 1977

Inventor(s) Roydon B Cooper

It is certified that error appears in the above-identified patent and that said Letters Patent are hereby corrected as shown below:

Column 12, line 19, "outer should read -- other --.

Column 14, line 16, "on" should read -- off --.

Column 14, line 38, "40" should read -- 70 --.

Column 15, line 59, "for" should read -- of --.

Column 16, line 8, "find" should read -- fluid --.

Column 20, line 23, claim 6, "sensing" should read -- sealing --.

Signed and Sealed this

Fourteenth Day of June 1977

[SEAL]

Attest:

RUTH C. MASON
*Attesting Officer*

C. MARSHALL DANN
*Commissioner of Patents and Trademarks*